US007820935B2

(12) United States Patent
Tverskoi et al.

(10) Patent No.: US 7,820,935 B2
(45) Date of Patent: Oct. 26, 2010

(54) BURNER

(75) Inventors: Vladimir Semenovich Tverskoi, Moscow (RU); Aleksei Vladimirovich Tverskoi, Moscow (RU)

(73) Assignee: Plazarium Ltd, Moscow (RU)

( * ) Notice: Subject to any disclaimer, the term of this patent is extended or adjusted under 35 U.S.C. 154(b) by 443 days.

(21) Appl. No.: 11/914,214

(22) PCT Filed: May 4, 2006

(86) PCT No.: PCT/RU2006/000229

§ 371 (c)(1),
(2), (4) Date: Feb. 5, 2008

(87) PCT Pub. No.: WO2006/121370

PCT Pub. Date: Nov. 16, 2006

(65) Prior Publication Data

US 2008/0230522 A1 Sep. 25, 2008

(30) Foreign Application Priority Data

May 13, 2005 (RU) .............................. 2005114329

(51) Int. Cl.
*B23K 10/00* (2006.01)

(52) U.S. Cl. ............................ 219/121.39; 219/121.48; 219/121.49; 219/121.46; 219/75; 315/111.21

(58) Field of Classification Search ............ 219/121.36, 219/121.39, 121.44, 121.45, 121.46, 121.48, 219/121.49, 121.5, 121.52, 74, 75; 313/231.31, 313/231.41; 315/111.21, 111.51
See application file for complete search history.

(56) References Cited

U.S. PATENT DOCUMENTS

| | | | | |
|---|---|---|---|---|
| 5,026,464 | A * | 6/1991 | Mizuno et al. | 588/311 |
| 5,560,844 | A * | 10/1996 | Boulos et al. | 219/121.59 |
| 5,719,370 | A | 2/1998 | Apunevich et al. | |
| 2003/0121893 | A1 * | 7/2003 | Sanders et al. | 219/121.39 |

FOREIGN PATENT DOCUMENTS

| | | | |
|---|---|---|---|
| EA | 001829 | B1 | 8/2001 |
| GB | 1380966 | A | 1/1975 |
| RU | 2057625 | C1 | 4/1996 |
| RU | 2066263 | C1 | 9/1996 |
| RU | 2072640 | C1 | 1/1997 |
| RU | 2112635 | C1 | 6/1998 |

* cited by examiner

*Primary Examiner*—Mark H Paschall
(74) *Attorney, Agent, or Firm*—Volpe and Koenig, P.C.

(57) ABSTRACT

A burner design used for thermal treatment of a surface of materials is presented. The burner includes a tubular electrode, a nozzle, a removable rod-shaped electrode which are arranged to form a discharge chamber, a means for vapor generation in the form of a reservoir provided with a flange and filled with a liquid-absorbing material, an electric arc vortex stabilization element, an element for cooling the nozzle and the electrode, and current leads. The reservoir flange is made in the form of a connection fitting and is provided with a partition having a central opening in which the tubular electrode is positioned to enable the formation of a heating element including an evaporator and a vapor superheater, both separated by the partition, the evaporator is provided with grooves for discharging vapor into a collector out of an annular recess on a surface of the vapor superheater arranged outside the reservoir.

5 Claims, 6 Drawing Sheets

BURNER

FIELD OF INVENTION

The invention relates to the design of a burner intended for thermal treatment of a surface of materials, in particular for burning-out the paint on metal barrels.

BACKGROUND

Known is a burner comprising, coaxially disposed in a housing, a tubular electrode, a nozzle having an axial through hole, a removable rod-shaped electrode arranged in a rod-shaped electrode holder coaxially within the tubular electrode at a gap with respect to said electrode and to the nozzle to enable the formation of a discharge chamber and to enable the axial reciprocating movement, a dielectric tube mounted on the electrode holder, a means for the contact excitation of an electric arc between the nozzle and the rod-shaped electrode, said means being made in the form of an interrupting electric contact and including a mechanism for axial movement of the rod-shaped electrode, which mechanism has a lead screw, a lead nut, a return spring, a slider and a button, a means for vapour generation and for feeding a plasma-forming medium in the form of vapour of a liquid working medium into the discharge chamber, said means including a reservoir in the form of a thin-wall shell having an end-face wall, a flange and a connection pipe for supplying the liquid working medium, which reservoir being coaxially coupled to the housing and being filled with a liquid-absorbing material to enable the liquid-absorbing material to contact with the tubular electrode and to enable communication of the reservoir with the discharge chamber, a means for vortex stabilization of the electric arc, a means for cooling the nozzle and the rod-shaped electrode, a means for centering the rod-shaped electrode with respect to the through hole of the nozzle, current leads for electrical connection of terminals of an autonomous electric current source, and a protection enclosure (the Eurasian Patent No. 001829, 27.08.2001—the closest prior art and prototype).

This known burner has the following disadvantages:

- temporal deterioration of the conveyance capabilities of the porous liquid-absorbing material in terms of providing inflow of the liquid working medium into the evaporation zone;
- deterioration of heat exchange intensity in the evaporation zone with an increase in heat flow occurring due to an high thermal resistance of the heating element in the evaporation zone as the consequence of displacement of the liquid working medium off the heating surface of the heating element.

In said burner, a film exists in the interior of the liquid-absorbing material's porous structure framework, which makes it difficult to withdraw the vapour, causes a destruction of the liquid-absorbing material structure, a degradation of the contact between the heating element and the liquid-absorbing material, and brings about a gap therebetween, so that ingress of a two-phase vapour-droplet mixture into the discharge chamber becomes possible.

SUMMARY

A technical effect of the invention comprises a simplification of the design and in an improvement of performance of the burner by virtue of performing the recovery of large heat flows having a high heat supply density, with a low thermal resistance.

This is achieved by that the end-face wall is made with a sealed central opening, the flange is made in the form of a connection fitting and is provided with a partition having a central opening, in which opening the tubular electrode is positioned to enable the formation of a heating element that comprises an evaporator and a vapour superheater, both being separated by the partition, the evaporator disposed in the reservoir has a length within the range of 1.8-3.0 of its outer diameter and is provided, on its surface, with grooves for discharging vapour into a collector out of an annular recess on a surface of the vapour superheater arranged outside the reservoir a also with a capillary-porous shell made of a material of high thermal conductivity and arranged to enable its one side to contact with a surface of the evaporator and its other side to contact with the liquid-absorbing material of low thermal conductivity, the housing is made in the form of a sleeve, one of whose ends has a thread to be connected to the flange to enable pressing the nozzle and the tubular electrode against the partition, the electric arc vortex stabilization element is made in the form of a swirler being a part of the vapour superheater adjacent to the nozzle and comprises tangential channels provided in the swirler and disposed in two planes perpendicular to the axis, a distance between said channels being 0.5-1.3 of the maximum value of a diameter of the discharge chamber's inner cavity, bores along the inner diameter are made in the swirler and the vapour superheater at both sides of their connection point, the dielectric tube is made with an inner cylindrical surface and an outer single-step cylindrical surface to form a cylindrical jut, and is arranged to enable mutual centering of the swirler, the tubular electrode and the dielectric tube with respect to the cylindrical jut, and projects in the reservoir beyond an end-face of the tubular electrode at least to a distance equal to 0.5 of its outer diameter; the dielectric tube end-face that faces the hole of the nozzle is positioned to form an end-face of the discharge chamber which is of the confuser type and has a length within the range of 0.5-1.8 of the maximum diameter value of its inner cavity, the lead screw is fixedly positioned along the axis of the rod-shaped electrode in the end-face wall and is made with a central single-step cylindrical opening to form a cavity having an end-face annular support surface that interacts with the return spring and having a radial slot along the axis of the lead screw, wherein a length of the slot corresponds to a travel value of the reciprocating movement of the rod-shaped electrode, the spring-loaded slider is made in the form of a cylinder having a radial hole, and is disposed in the cavity of the lead screw with one of the end-faces being supported by the return spring and to be capable of the axial reciprocating movement limited by the current lead shaped as a pin positioned in the slider's radial hole to be capable of fixation and disposed in the slot of the lead screw, the other slider's end-face projects out of the cavity of the lead screw, the lead nut is coupled, by a thread, to the lead screw to enable the interaction by its annular end-face support surface with the pin-shaped current lead that projects from the slot of the lead screw, the slider's end-face projecting from the lead screw cavity is provided with the button extending from the lead nut's central hole so that to be capable of the axial reciprocating movement, the slider is connected to the electrode holder that is made at the side of connection with the rod-shaped electrode to have a diameter within the range of 1.01-1.25 of a diameter of the rod-shaped electrode, and to have a developed heat-exchange surface along the length at least between the dielectric tube end-face in the reservoir and the end-face wall, such that to enable centering of the lead screw's cavity and the dielectric tube's inner cylindrical surface along the cylindrical surface, wherein the diameter of the rod-shaped electrode is within the range of 0.27-0.83 of a maximum diameter value of the discharge chamber's inner cavity, a lateral dimension of the reservoir in the evaporator zone is 1.7-3.2 of the evaporator's outer diameter, a length of the reservoir is selected within the range of 1.5-3.5 of the length of the evaporator, and a ratio of the total cross section area of the grooves on the evaporator's surface to the total area of the pass-through sections of the tangential channels is 0.7-1.5.

Advantageously, the grooves for discharging vapour are made to have a width within the range of 0.3-0.6 mm, a depth within the range of 0.3-0.5 mm, and a width of the projection rib within the range of a/h=0.6-0.7.

Also advantageously, a thickness of the tubular electrode's wall on the evaporator area is made within the range of 0.5-2 mm.

Further, the capillary-porous shell made of a material of high thermal conductivity is to be made to have a bulk porosity of 0.7-0.8, an average pore size of 20-100 μm, and a thickness of 0.8-2 mm.

Further, the liquid-absorbing material of low thermal conductivity is to be made to have a bulk porosity within the range of 0.6-0.9, at an average pore size of 20-50 μm.

BRIEF DESCRIPTION OF THE DRAWINGS

In the following, the invention is explained by a particular example of its embodiment and by the accompanying drawings in which.

DETAILED DESCRIPTION OF THE PREFERRED EMBODIMENTS

Best Mode of Carrying Out the Invention

Figure 1:
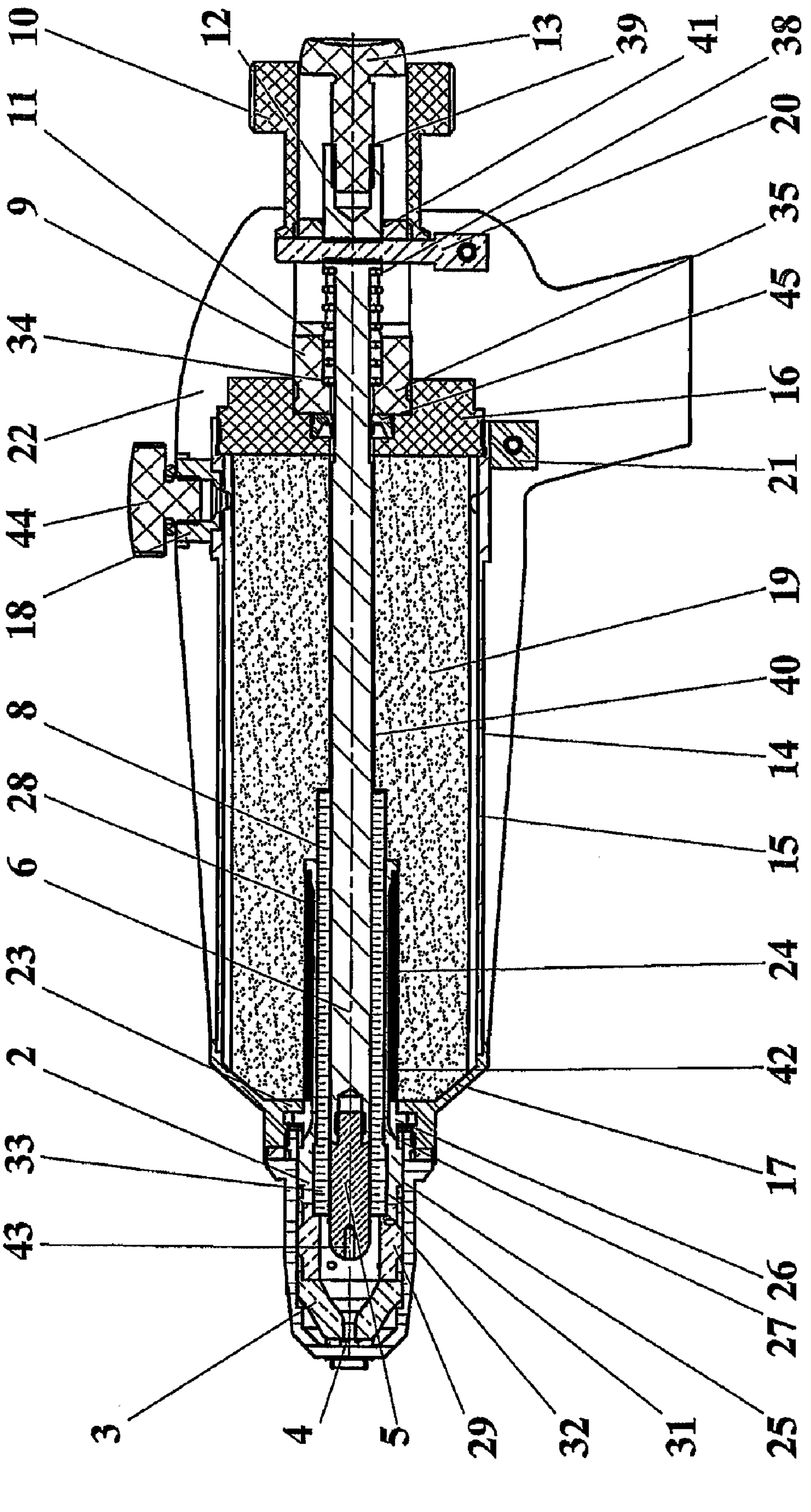
FIG. 1 shows the assembled burner, in cross section, according to the invention.

The burner comprises, coaxially disposed in a housing 1, a tubular electrode 2, a nozzle 3 having an axial through hole 4, a removable rod-shaped electrode 5 arranged in a rod-shaped electrode holder 6 coaxially within the tubular electrode 2 and at a gap with respect to said electrode and to the nozzle 3 to enable the formation of a discharge chamber 7 and to enable the axial reciprocating movement (FIG. 1).

The burner comprises a dielectric tube 8 mounted on the electrode holder 6, an element for the contact excitation of an electric arc between the nozzle 3 and the rod-shaped electrode 5, the element is made in the form of an interrupting electric contact and includes a mechanism for the axial movement of the rod-shaped electrode 5, the mechanism has a lead screw 9, a lead nut 10, a return spring 11, a slider 12 and a button 13.

The burner comprises an element for vapour generation and for feeding a plasma-forming medium in the form of vapour of a liquid working medium into the discharge chamber, the element includes a reservoir 14 in the form of a thin-wall shell 15 having an end-face wall 16, a flange 17 and a connection pipe 18 for supplying the liquid working medium, which reservoir is coaxially coupled to the housing 1 and is filled with a liquid-absorbing material 19 to enable the liquid-absorbing material 19 to contact with the tubular electrode 2 and to enable communication of the reservoir 14 with the discharge chamber 7.

The burner comprises an element for vortex stabilization of the electric arc, a cooling element for the nozzle 3 and the rod-shaped electrode 5, an element for centering the rod-shaped electrode 5 with respect to the through hole 4 of the nozzle 3, current leads 20, 21 for electrical connection of terminals of an autonomous electric current source, and a protection enclosure 22.

The end-face wall 16 is made with a sealed central opening, the flange 17 is made in the form of a connection fitting and is provided with a partition 23 having a central opening, in which opening the tubular electrode 2 is positioned to enable the formation of a heating element that comprises an evaporator 24 and a vapour superheater 25, both being separated by the partition 23.

Figure 2:
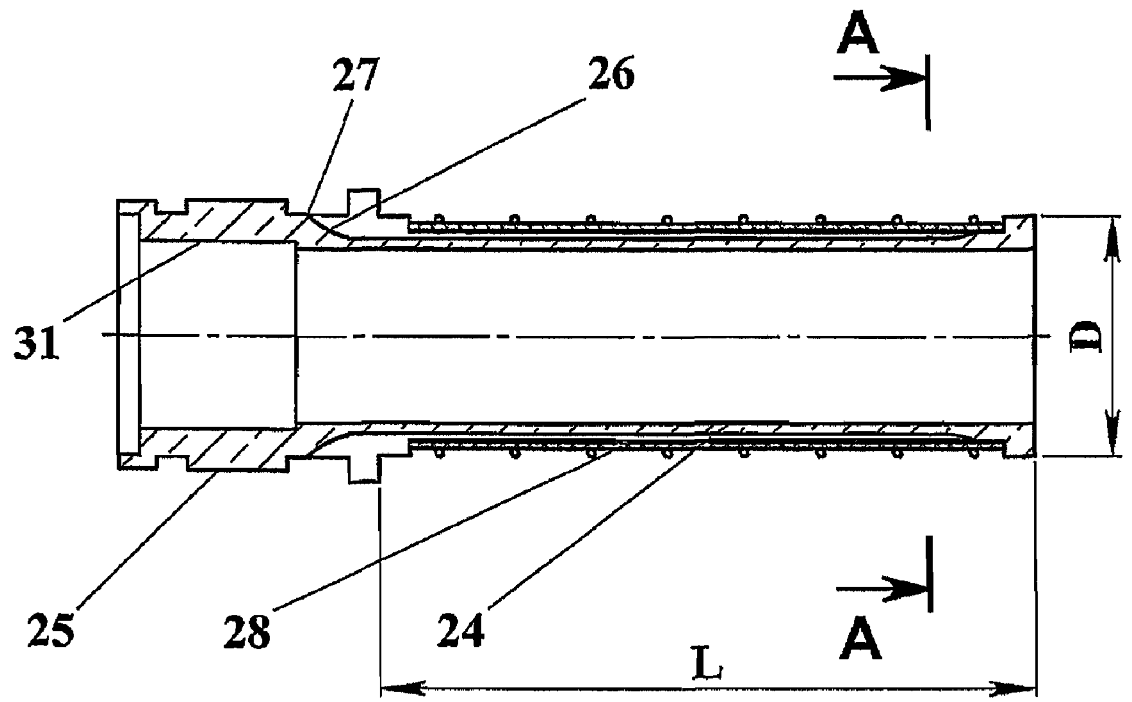
FIG. 2 is the assembled heating element, in cross section, according to the invention.
Figure 3:
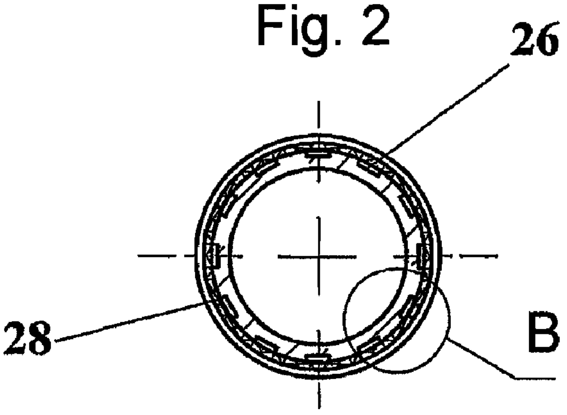
FIG. 3 is idem, section A-A, according to the invention.

The evaporator 24 (FIG. 2) disposed in the reservoir 14 has a length L within the range of 1.8-3.0 of its outer diameter D and is provided, on its surface, with grooves 26 (FIG. 3, FIG. 4) for discharging vapour into a collector 27 out of an annular recess on a surface of the vapour superheater 25 arranged outside the reservoir 14 and also with a capillary-porous shell 28 made of a material of high thermal conductivity and arranged to enable its one side to contact with a surface of the evaporator 24 and its other side to contact with the liquid-absorbing material 19 of low thermal conductivity.

The housing 1 is made in the form of a sleeve, one of whose ends has a thread to be connected to the flange 17 to enable pressing the nozzle 3 and the tubular electrode 2 against the partition 23.

Figure 5:
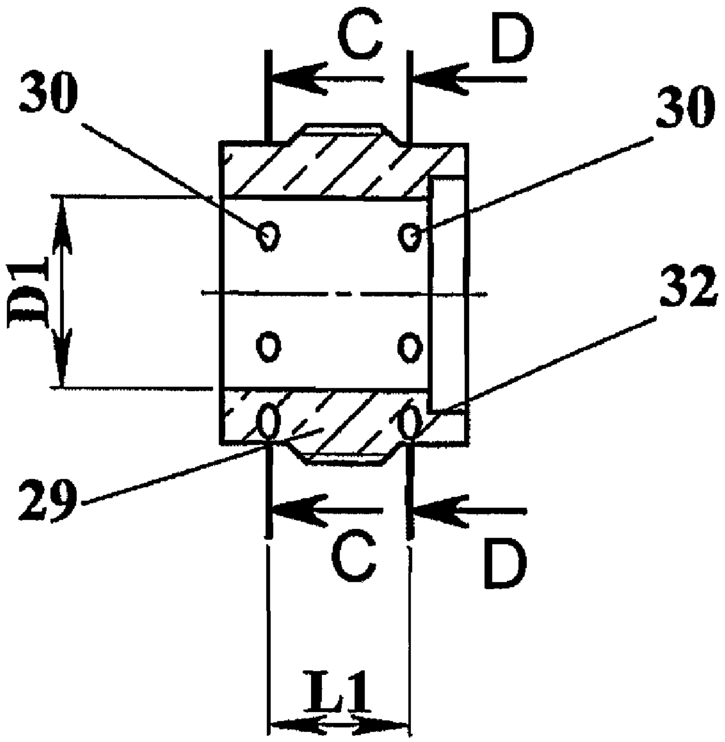
FIG. 5 is the swirler according to the invention.
Figure 6:
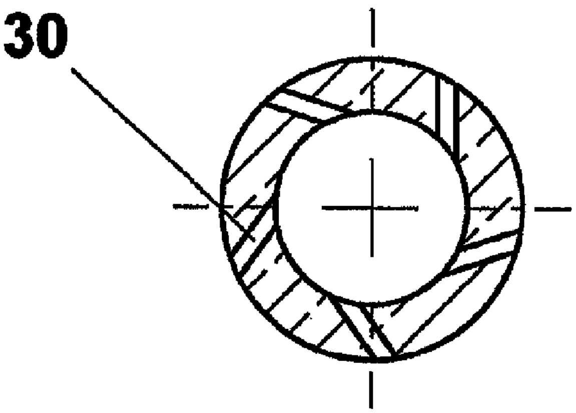
FIG. 6 is idem, sections C-C, D-D (coinciding), according to the invention.

The electric arc vortex stabilization element is made in the form of a swirler 29 (FIG. 5) being a part of the vapour superheater 25, said part being adjacent to the nozzle 3, and comprises tangential channels 30 (FIG. 6) provided in the swirler 29 and disposed in two planes perpendicular to the axis, a distance L1 between said channels being 0.5-1.3 of the maximum value of a diameter D1 of the discharge chamber's 7 inner cavity. Bores 31, 32 along the inner diameter are made in the swirler 29 and the vapour superheater 25 at both sides of their connection point.

The dielectric tube 8 is made with an inner cylindrical surface and an outer single-step cylindrical surface to form a cylindrical jut 33, and is arranged to enable mutual centering of the swirler 29, the tubular electrode 2 and the dielectric tube 8 with respect to the cylindrical jut 33, and projects in the reservoir 14 beyond an end-face of the tubular electrode 2 at least to a distance equal to 0.5 of its outer diameter. The dielectric tube's 8 end-face that faces the hole 4 of the nozzle 3 is positioned to form an end-face of the discharge chamber 7, which discharge chamber is of the confuser type and has a length within the range of 0.5-1.8 of the maximum diameter value of its inner cavity.

Figure 7:
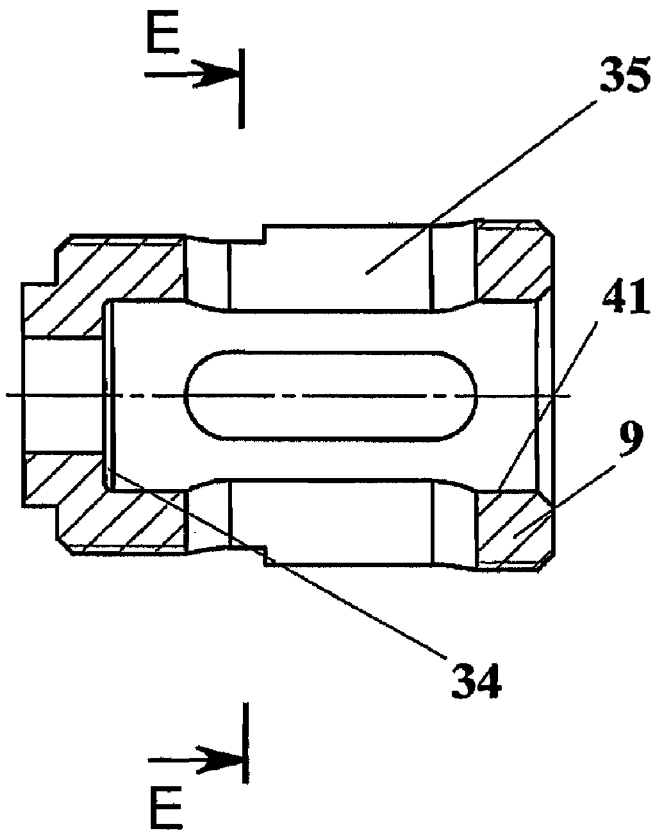
FIG. 7 is the lead screw according to the invention.
Figure 8:
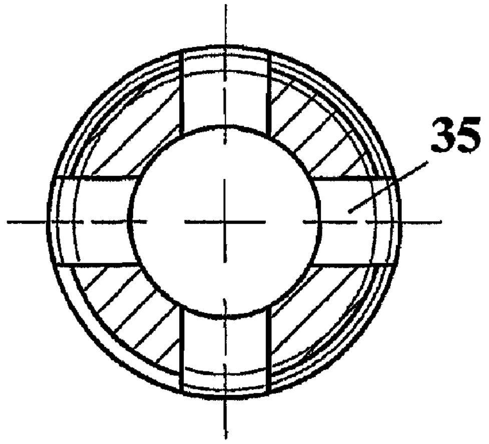
FIG. 8 is idem, section E-E, according to the invention.

The lead screw 9 is fixedly positioned along the axis of the rod-shaped electrode 5 in the end-face wall 16 and is made with a central single-step cylindrical opening to form a cavity having an end-face annular support surface 34 that interacts with the return spring 11, and having a radial slot 35 along the axis of the lead screw 9 (FIG. 7, FIG. 8). Meanwhile, a length of the slot 35 corresponds to a travel value of the reciprocating movement of the rod-shaped electrode 5.

The spring-loaded slider 12 is made in the form of a cylinder having a radial hole and is disposed in the cavity of the lead screw 9 with one of the end-faces 38 being supported by the return spring 11 and to be capable of the axial reciprocating movement, which movement is limited by the current lead 20 shaped as a pin positioned in the slider's 12 radial hole to be capable of fixation and disposed in the slot 35 of the lead screw 9. The other slider's 12 end-face projects out of the cavity of the lead screw 9.

Figure 9:
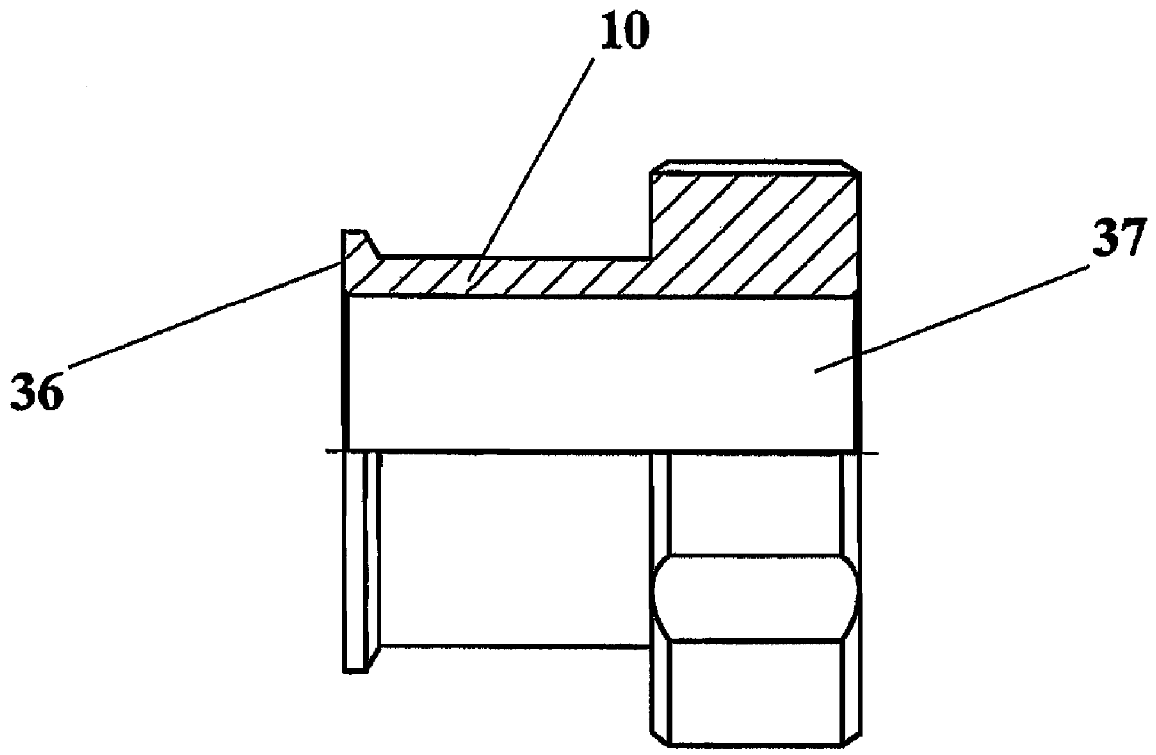
FIG. 9 is the lead nut according to the invention.
Figure 10:
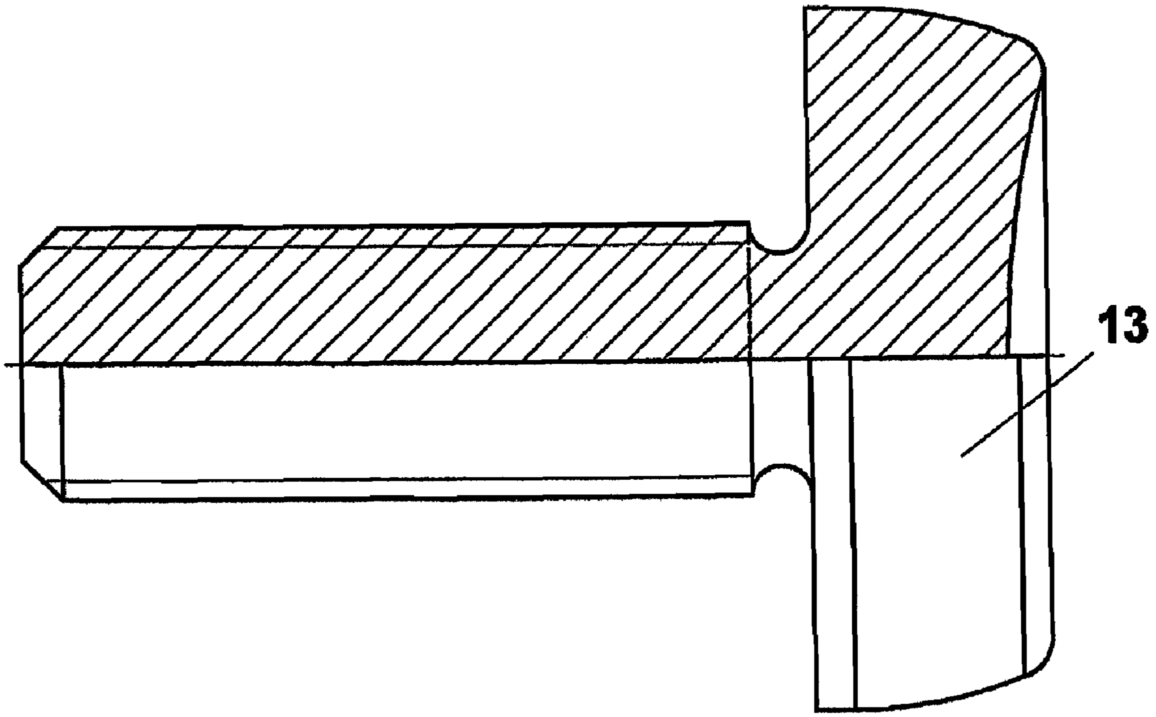
FIG. 10 is the button according to the invention.

The lead nut 10 (FIG. 9) is coupled, by a thread, to the lead screw 9 to enable the interaction by its annular end-face support surface 36 with the pin-shaped current lead 20 that projects radially from the slot 35 of the lead screw 9, the slider's 12 end-face 39 projecting from the cavity of the lead screw 9 is provided with the button 13 (FIG. 10) extending from the lead nut's 10 central hole 37 so that to be capable of the axial reciprocating movement.

The slider 12 is connected to the electrode holder 6 that is made at the side of connection with the rod-shaped electrode 5 to have a diameter within the range of 1.01-1.25 of a diameter of the rod-shaped electrode 5, and to have a developed heat-exchange surface 40 along the length at least between the dielectric tube's 8 end-face in the reservoir 14 and the end-face wall 16, such that to enable centering of the lead screw's 9 cavity and the dielectric tube's 8 inner cylindrical surface 42 along the cylindrical surface 41.

The diameter of the rod-shaped electrode 5 is within the range of 0.27-0.83 of a maximum diameter value of the discharge chamber's 7 inner cavity, a lateral dimension of the reservoir 14 in the evaporator's 24 zone is 1.7-3.2 of the evaporator's 24 outer diameter D, a length of the reservoir 14 is selected within the range of 1.5-3.5 of the length L of the evaporator 24, and a ratio of the total cross section area of the grooves 26 on the evaporator's 24 surface to the total area of the pass-through sections of the tangential channels 30 is 0.7-1.5.

Figure 4:
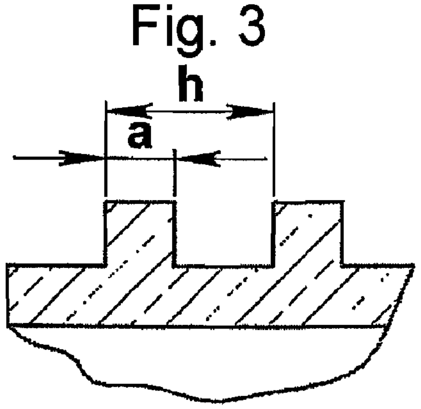
FIG. 4 is idem, unit B, according to the invention.

The grooves 26 for discharging vapour are made to have a width within the range of 0.3-0.6 mm, a depth of 0.3-0.5 mm and a width of the projection rib within the range of a/h=0.6-0.7 (FIG. 4).

A thickness of the tubular electrode's 2 wall on the evaporator's 24 area is made within the range of 0.5-2 mm.

The capillary-porous shell 28 made of a material of high thermal conductivity is made to have a bulk porosity of 0.7-0.8, an average pore size of 20-100 μm, and a thickness of 0.8-2 mm.

The moisture-absorbing material 19 of low thermal conductivity is made to have a bulk porosity within the range of 0.6-0.9, at an average pore size of 20-50 μm.

The burner also comprises an insert 43 made of a heat-emissive material (hafnium, zirconium) and disposed in the electrode 5, a plug 44 disposed in the connection pipe 18, and a seal 15 for the central opening of the flange 16.

The burner operates as follows:

1) Surface treatment of materials with an indirect-action compressed arc (a plasma jet). The liquid working medium is supplied through the connection pipe 18, while impregnating the liquid-absorbing material 19 in the reservoir 14 and while causing said medium to fill the channels communicating the reservoir with the discharge chamber, until a drop of the liquid working medium appears out of the through hole 4 of the nozzle 3. The connection pipe 18 is closed by the plug 44. The autonomous electric current source is turned on, and a voltage is applied to the rod-shaped electrode 5 across the nozzle 3. By pressing the button 13, the reciprocating movement is imparted to the rod-shaped electrode 5 and the end-face of the rod-shaped electrode 5 is, for a brief time, moved closer to the nozzle 3 to reach the mutual contact position, then the button 13 is released, and the return spring 11 retracts the rod-shaped electrode 5 away from the nozzle 3 to the initial position, thus creating a gap allowing the liquid working medium to flow through the through hole 4 of the nozzle 3. When the electric contact between the rod-shaped electrode 5 and the nozzle 3 is broken, an electric arc is excited therebetween. The energy that is released upon the nozzle 3 as an electric current flows through the arc, heats the same, and the heat is transferred via the tubular electrode 2 to the liquid working medium. The liquid working medium transforms into vapour that is used as the plasma-forming medium, thus creating an excess pressure, under action of which the vapour goes along the channels communicating the reservoir with the discharge chamber, compresses the electric arc column and exits via the through hole 4 of the nozzle 3, with the generation of a plasma jet. The moisture-absorbing material 19 ensures a uniform feeding of the evaporator's 24 area of the heating element with the liquid working medium and, accordingly, a temporally even evaporation of the liquid working medium. The optimal gap between the rod-shaped electrode 5 and the nozzle 3 is set by a rotation (screwing-on or screwing-off) of the lead nut 10, thus displacing the slider 12 associated with the electrode holder 6. In order to change electric power developed in the electric arc, an output current of the electric current source is changed.

2) Surface treatment of materials with a direct-action compressed arc (an external electric arc coincident with a plasma jet). All the operations necessary for the surface treatment of materials with the indirect-action compressed arc are carried out. Further, a voltage is applied and a potential difference between the rod-shaped electrode 5 and a metal to be treated is created. Then, a distance between the nozzle 3 and the metal to be treated is decreased till the direct (external) electric arc between the rod-shaped electrode and the metal to be treated occurs.

Thus, the burner made in accordance to the proposed technical solutions ensures excellent performance and functionality.

When performing tests of the burner made in accordance to the invention, stable excitation and burning of the electric arc has been obtained, with reliable cooling of its structure components within the arc current range of 4-16 A and within the arc voltage range of 80-200V. The burner steadily operates in any spatial position.

The tests have shown that the burner reliably functions when distilled water, an aqueous solution of hydrogen peroxide, and also mixtures and emulsions of a liquid carbon-containing fuel and an aqueous solution of hydrogen peroxide are used as the liquid working medium.

INDUSTRIAL APPLICABILITY

The invention can be used in the manufacture of burners for surface treatment of materials by a plasma jet, or by an external electric arc coincident with the plasma jet, as well as for concentration of heat during heating, cutting, soldering and welding of metals in repair workshops and in mechanical engineering when mounting metal structures.

The invention claimed is:

1. A burner comprising, coaxially disposed in a housing, a tubular electrode, a nozzle having an axial through hole, a removable rod-shaped electrode arranged in a rod-shaped electrode holder coaxially within the tubular electrode and at a gap with respect to said electrode and to the nozzle to enable the formation of a discharge chamber and to enable the axial reciprocating movement, a dielectric tube mounted on the electrode holder, an element for the contact excitation of an electric arc between the nozzle and the rod-shaped electrode, said element being made in the form of an interrupting electric contact and including a mechanism for the axial movement of the rod-shaped electrode, said mechanism having a lead screw, a lead nut, a return spring, a slider and a button, an element for vapour generation and for feeding a plasma-forming medium in the form of vapour of a liquid working medium into the discharge chamber, said element including a reservoir in the form of a thin-wall shell having an end-face wall, a flange and a connection pipe for supplying the liquid working medium, which reservoir being coaxially coupled to the housing and being filled with a liquid-absorbing material to enable the liquid-absorbing material to contact with the tubular electrode and to enable communication of the reservoir with the discharge chamber, a vortex stabilization element of the electric arc, an element cooling the nozzle and the rod-shaped electrode, an element for centering the rod-shaped electrode with respect to the through hole of the nozzle, current leads for electrical connection of terminals of an autonomous electric current source, and a protection enclosure, the end-face wall is made with a sealed central opening, the flange is made in the form of a connection fitting and is provided with a partition having a central opening, in which opening the tubular electrode is positioned to enable the formation of a heating element that comprises an evaporator and a vapour superheater, both being separated by the partition, the evaporator disposed in the reservoir has a length within the range of 1.8-3.0 of its outer diameter and is provided, on its surface, with grooves for discharging vapour into a collector out of an annular recess on a surface of the vapour superheater arranged outside the reservoir and also with a capillary-porous shell made of a material of high thermal conductivity and arranged to enable its one side to contact with a surface of the evaporator and its other side to contact with the liquid-absorbing material of low thermal conductivity, the housing is made in the form of a sleeve, one of whose ends has a thread to be connected to the flange to enable pressing the nozzle and the tubular electrode against the partition, the electric arc vortex stabilization element is made in the form of a swirler being a part of the vapour superheater, said part being adjacent to the nozzle, and comprises tangential channels provided in the swirler and disposed in two planes perpendicular to the axis, a distance between said channels being 0.5-1.3 of a maximum value of a diameter of the discharge chamber's inner cavity, bores along the inner diameter are made in the swirler and the vapour superheater at both sides of their connection point, the dielectric tube is made with an inner cylindrical surface and an outer single-step cylindrical surface to form a cylindrical jut, and is arranged to enable mutual centering of the swirler, the tubular electrode and the dielectric tube with respect to the cylindrical jut, and projects in the reservoir beyond an end-face of the tubular electrode at least to a distance equal to 0.5 of its outer diameter, the dielectric tube end-face that faces the hole of the nozzle is positioned to form an end-face of the discharge chamber which is of the confuser type and has a length within the range of 0.5-1.8 of the maximum diameter value of its inner cavity, the lead screw is fixedly positioned along the axis of the rod-shaped electrode in the end-face wall and is made with a central single-step cylindrical opening to form a cavity having an end-face annular support surface that interacts with the return spring, and having a radial slot along an axis of the lead screw, wherein a length of the slot corresponds to a travel value of the reciprocating movement of the rod-shaped electrode, the spring-loaded slider is made in the form of a cylinder having a radial hole and is disposed in the cavity of the lead screw with one of the end-faces being supported by the return spring and to be capable of the axial reciprocating movement limited by the current lead shaped as a pin positioned in the slider's radial hole to be capable of fixation and disposed in the slot of the lead screw, the other slider's end-face projects out of the cavity of the lead screw, the lead nut is coupled, by a thread, to the lead screw to enable the interaction by its annular end-face support surface with the pin-shaped current lead that projects radially from the slot of the lead screw, the slider's end-face projecting from the cavity of the lead screw is provided with the button extending from the lead nut's central hole so that to be capable of the axial reciprocating movement, the slider is connected to the electrode holder that is made at the side of connection with the rod-shaped electrode to have a diameter within the range of 1.01-1.25 of a diameter of the rod-shaped electrode, and to have a developed heat-exchange surface along the length at least between the dielectric tube end-face in the reservoir and the end-face wall, such that to enable centering of the lead screw's cavity and the dielectric tube's inner cylindrical surface along the cylindrical surface, wherein the diameter of the rod-shaped electrode is within the range of 0.27-0.83 of a maximum diameter value of the discharge chamber's inner cavity, a lateral dimension of the reservoir in the evaporator's zone is 1.7-3.2 of the evaporator's outer diameter, a length of the reservoir is selected within the range of 1.5-3.5 of the length of the evaporator, and a ratio of the total cross section area of the grooves on the evaporator's surface to the total area of pass-through sections of the tangential channels is 0.7-1.5.

2. The burner according to claim 1, wherein the grooves for discharging vapour are made to have a width within the range of 0.3-0.6 mm, a depth of 0.3-0.5 mm and a width of the projection rib within the range of a/h=0.6-0.7.

3. The burner according to claim 1, wherein a thickness of the tubular electrode's wall on the evaporator area is made within the range of 0.5-2 mm.

4. The burner according to claim 1, wherein the capillary-porous shell made of a material of high thermal conductivity is made to have a bulk porosity of 0.7-0.8, an average pore size of 20-100 μm and a thickness of 0.8-2 mm.

5. The burner according to claim 1, wherein the liquid-absorbing material of low thermal conductivity is made to have a bulk porosity within the range of 0.6-0.9, at an average pore size of 20-50 μm.

* * * * *